US007729481B2

(12) United States Patent
Thompson et al.

(10) Patent No.: US 7,729,481 B2
(45) Date of Patent: Jun. 1, 2010

(54) USER INTERFACE FOR INTEGRATING DIVERSE METHODS OF COMMUNICATION

(75) Inventors: Brooke Thompson, San Francisco, CA (US); Greg Rosenberg, San Mateo, CA (US); Ryan Michael Olshavsky, Los Gatos, CA (US); Brian Kobashikawa, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1027 days.

(21) Appl. No.: 11/261,984

(22) Filed: Oct. 28, 2005

(65) Prior Publication Data

US 2007/0116195 A1    May 24, 2007

(51) Int. Cl.
 *H04M 11/00* (2006.01)
 *G06F 15/16* (2006.01)
(52) U.S. Cl. ............... 379/93.01; 379/90.01; 379/88.13
(58) Field of Classification Search ............... 379/93.01, 379/90.01, 93.05, 88.13, 88.14, 88.16, 88.17, 379/93.24; 709/200–203, 206–207, 223–224, 709/250, 227–229; 707/10; 455/413, 414.4
 See application file for complete search history.

(56) References Cited

U.S. PATENT DOCUMENTS

| 6,671,508 | B1 * | 12/2003 | Mitsuoka et al. ......... 455/412.1 |
|---|---|---|---|
| 7,080,148 | B2 | 7/2006 | Weigand |
| 2001/0003202 | A1 | 6/2001 | Mache et al. |
| 2001/0047305 | A1 | 11/2001 | Bowen, Jr. |
| 2002/0007398 | A1 | 1/2002 | Mendiola et al. |
| 2002/0107856 | A1 | 8/2002 | Scheussler et al. |
| 2002/0108052 | A1 | 8/2002 | Maruyama |
| 2003/0228722 | A1 | 12/2003 | Wristers et al. |
| 2003/0229722 | A1 | 12/2003 | Beyda |
| 2004/0054736 | A1 | 3/2004 | Daniell et al. |
| 2004/0073621 | A1 | 4/2004 | Sampson |
| 2004/0078446 | A1 | 4/2004 | Daniell et al. |
| 2004/0078448 | A1 | 4/2004 | Malik et al. |
| 2004/0181550 | A1 | 9/2004 | Warsta et al. |
| 2005/0071434 | A1 | 3/2005 | Hettish et al. |
| 2005/0091329 | A1 * | 4/2005 | Friskel ....................... 709/206 |
| 2005/0132012 | A1 | 6/2005 | Muller et al. |

(Continued)

OTHER PUBLICATIONS

International Search Report mailed on Jul. 31, 2008, for PCT Application No. PCT/US2008/054622, filed on Feb. 21, 2008, four pages.
Written Opinion mailed on Jul. 31, 2008, for PCT Application No. PCT/US2008/054622, filed on Feb. 21, 2008, four pages.
Final Office Action mailed on Sep. 18, 2009, for U.S. Appl. No. 11/710,050, filed on Feb. 23, 2007, twelve pages.

(Continued)

*Primary Examiner*—Melur Ramakrishnaiah
(74) *Attorney, Agent, or Firm*—Morrison & Foerster LLP

(57) ABSTRACT

An integrated communication interface is provided for composing and sending messages. The interface is multi-configurable to seamlessly switch between different communication methods, e.g., electronic mail, instant messaging, SMS, chat, voice, and the like, without loss of message content. The interface allows a user to begin composing a message to be sent using one communication method, such as electronic mail, and subsequently change the communication method and send the message via a second communication method, such as instant messaging. When the communication method is changed, the user interface may also change to include elements specific to a particular communication method. The integrated communication interface may display information about participants in the communication, such as the participants' presence, i.e., whether they are online and available for communication, and may automatically choose the best method of communication based on the preferences and online presence of the participants.

34 Claims, 16 Drawing Sheets

U.S. PATENT DOCUMENTS

| | | |
|---|---|---|
| 2006/0025164 A1 | 2/2006 | Wang et al. |
| 2006/0052127 A1* | 3/2006 | Wolter .................. 455/519 |
| 2006/0101119 A1 | 5/2006 | Qureshi et al. |
| 2006/0168315 A1 | 7/2006 | Daniell et al. |
| 2007/0002825 A1 | 1/2007 | O'Brien et al. |
| 2007/0011186 A1* | 1/2007 | Horner et al. ............ 707/102 |
| 2008/0208984 A1 | 8/2008 | Rosenberg et al. |
| 2008/0222256 A1 | 9/2008 | Rosenberg et al. |

OTHER PUBLICATIONS

International Preliminary Report on Patentability mailed on Sep. 3, 2009, for PCT Application No. PCT/US2008/054622, filed on Feb. 21, 2008, six pages.

Non-Final Office Action mailed on Apr. 30, 2009, for U.S. Appl. No. 11/710,050, filed on Feb. 23, 2007, twelve pages.

* cited by examiner

FIG. 16

Participants table — 1601

| Participant — 1602 | ParticipantData — 1603 |
|---|---|
| Ed — 1608 | Associated CommMethodToAddress table — 1604<br>Presence: Online — 1605<br>Preferences: Email=Yes, IM=No — 1606 |
| Liz | Associated CommMethodToAddress table<br>Presence: Offnline<br>Preferences: Email=Yes, IM=Yes |
| ... | ... |

FIG. 17

CommMethodToAddress table — 1701

| CommMethod — 1705 | Protocol Address — 1706 |
|---|---|
| Email — 1709 | edweber@isp.net — 1707 |
| IM | edweber |
| SMS | 31131 |
| ... | ... |

USER INTERFACE FOR INTEGRATING DIVERSE METHODS OF COMMUNICATION

BACKGROUND

1. Field of the Invention

The present invention relates generally to electronic communication, and in one aspect to systems and methods for simplifying the use of multiple different methods of communication.

2. Description of the Related Art

There are many different methods for electronic communication, including electronic mail (Email), instant messaging (IM), text messaging, Short Message Service (SMS), chat, Voice Over IP (VOIP), and voicemail. A communication method is sometimes referred to herein as a messaging protocol. Each communication method typically has its own corresponding user interface in the form of a web site, physical communication device, or client application. Examples of such user interfaces are Web clients, including Web electronic mail clients, Web instant messaging clients, and Personal Computer-based client programs, including electronic mail client programs, instant messaging client programs, and SMS client programs.

To send an electronic message, a user typically selects a communication method, and then uses the method's user interface to compose and send a message to a recipient. Each communication method has benefits and drawbacks, particularly in terms of the type of messages that can be sent and the amount of time that will elapse before the recipient reads the message. For example, an email message can contain many different types of information content, including text, audio, and video, but cannot be received by certain communication devices such as cell phones, and so may not be immediately readable by a recipient who has access to a cell phone but not an email client. An SMS text message, on the other hand, can contain only text, but can be read immediately if the recipient has access to an appropriate cell phone. Since the best communication method to use can vary depending on the circumstances, it is desirable to allow the user to choose the communication method. In existing systems, each communication method generally has a different communication interface. For example, a communication system may have an electronic mail client and a separate instant messaging client. Furthermore, the different interfaces are generally not closely integrated. For example, messages composed using the electronic mail client would be separate from messages composed using the instant messaging client. The need for different interfaces also causes some users to avoid using different communication methods, even when those different methods would be superior. For example, a user who has an email client account may never use instant messaging because of the need for a different account and interface for instant messaging. Furthermore, even if a user does have an instant messaging account, the user must choose whether to use email or instant messaging when composing a message. Because of these restrictions, it would be desirable to integrate these different interfaces together to allow users to more easily choose between different communication methods, and further to easily transfer between different communication methods and user interfaces.

SUMMARY OF THE INVENTION

According to one example, an integrated communication interface is provided for composing and sending messages. The interface is multi-configurable to seamlessly switch between different communication methods, e.g., electronic mail, instant messaging, short message service (SMS), and the like, without loss of message content. The interface allows a user to begin composing a message to be sent using one communication method, such as electronic mail, and subsequently change the communication method and send the message via a second communication method, such as instant messaging or SMS. When the communication method is changed, the user interface may also change to include elements specific to a particular communication method. The integrated communication interface may display information about participants in the communication, such as their online presence, and may automatically choose the best or preferred method of communication based on their preferences and their online presence. Message content may be any form of media, including text, audio, and video. Online presence is an indication of whether the participant is currently online. For example, a user's online presence may indicate to other users that the user is online now or is not online now. A user may use online presence information about another user to find out if the second user is online. A user who is online may, for example, be notified of receipt of a message and read the message almost immediately after the message is sent by another user. Online presence information may be associated with a particular method of communication.

According to one scenario, a user may begin a conversation by composing an instant message to be sent to a participant. The user may find that the participant is not online according to an online presence indicator, and decide to send the message via email instead. According to this scenario, the user can send the composed message via email without entering any additional information or performing any actions to transfer the message text for use with the new communication medium. For example, the user does not have to open a new window or interface, or cut and paste the message, to send the message using the new communication medium.

According to another scenario, a user may begin a conversation by composing a text message, but may compose more text than can be contained in a single text message. According to this scenario, the user can switch to a different communication method that can send all of the text in a single message. The user is not required to re-enter the message or enter a communication address such as an email address. Instead, the integrated communication interface will preserve the composed text when the user switches to a different communication method, and will automatically fill in the communication address.

In yet another scenario, a user of the integrated communication method may be communicating via instant messaging with a participant who goes offline during the conversation. The participant has access to an SMS-capable cell phone. The user can continue the conversation by switching the communication mode to SMS. The user continues to use essentially the same interface to communicate via SMS. Any message that the user was composing before switching continues to be available, and the user is not required to enter the participant's address.

In general, in a first aspect, the invention features messaging interface logic, which includes display logic for causing the display of a list of communication methods, communication method selection logic for enabling selection of a selected communication method from the list, and messaging logic for initiating transmission of input content to at least one recipient based upon the selected communication method. Embodiments of the invention may include one or more of the following features. The communication methods may include messaging protocols. Selection of the at least one communication method may not alter the input content. The messaging interface logic may have a format based upon the selected communication method. The input content may comprise text or voice. The list of communication methods may include electronic mail, instant messaging, short message service, and chat.

The list of communication methods may be based upon presence and/or preference information associated with the at least one recipient. The list of communication methods may be in a sorted order based upon presence and/or preference information associated with the at least one recipient. The list of communication methods may include a text-based method and a voice-based method, and the messaging interface logic may also include translation logic for translating the input content between text and voice. Translating the input content between text and voice may be initiated in response to a change of the selected communication method.

In general, in a second aspect, the invention features participant listing logic, which includes list display logic for displaying a list of at least one participant, where the at least one participant is associated with a list of at least one selectable communication method, and which also includes selection logic for enabling selection of a selected communication method from the list of at least one selectable communication method, where selection activates messaging interface logic configured for sending a message to the at least one participant using the selected communication method.

Embodiments of the invention may include one or more of the following features. The selection logic may enable selection of a selected participant from the list of at least one participant, wherein selection of the selected participant activates messaging interface logic configured for sending a message to the selected participant using a default communication method associated with the selected participant. The participant listing logic may also include participant display logic for causing the display of a participant display associated with the at least one participant, where the participant display includes a list of at least one communication method, and may also include communication method selection logic for selection of the default communication method from the list of at least one communication method. An online presence indicator may be associated with the at least one participant, and the online presence indicator may be based upon online presence information associated with the at least one participant. A status indicator may be associated with the at least one participant, and the status indicator may be based upon availability status information associated with the at least one participant.

BRIEF DESCRIPTION OF THE DRAWINGS

FIGS. 12-16 are flowcharts illustrating methods of providing integrated communication interfaces according to some examples.

FIGS. 17-18 illustrate tables used for providing integrated communication interfaces according to some examples.

DETAILED DESCRIPTION OF A PREFERRED EMBODIMENT

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
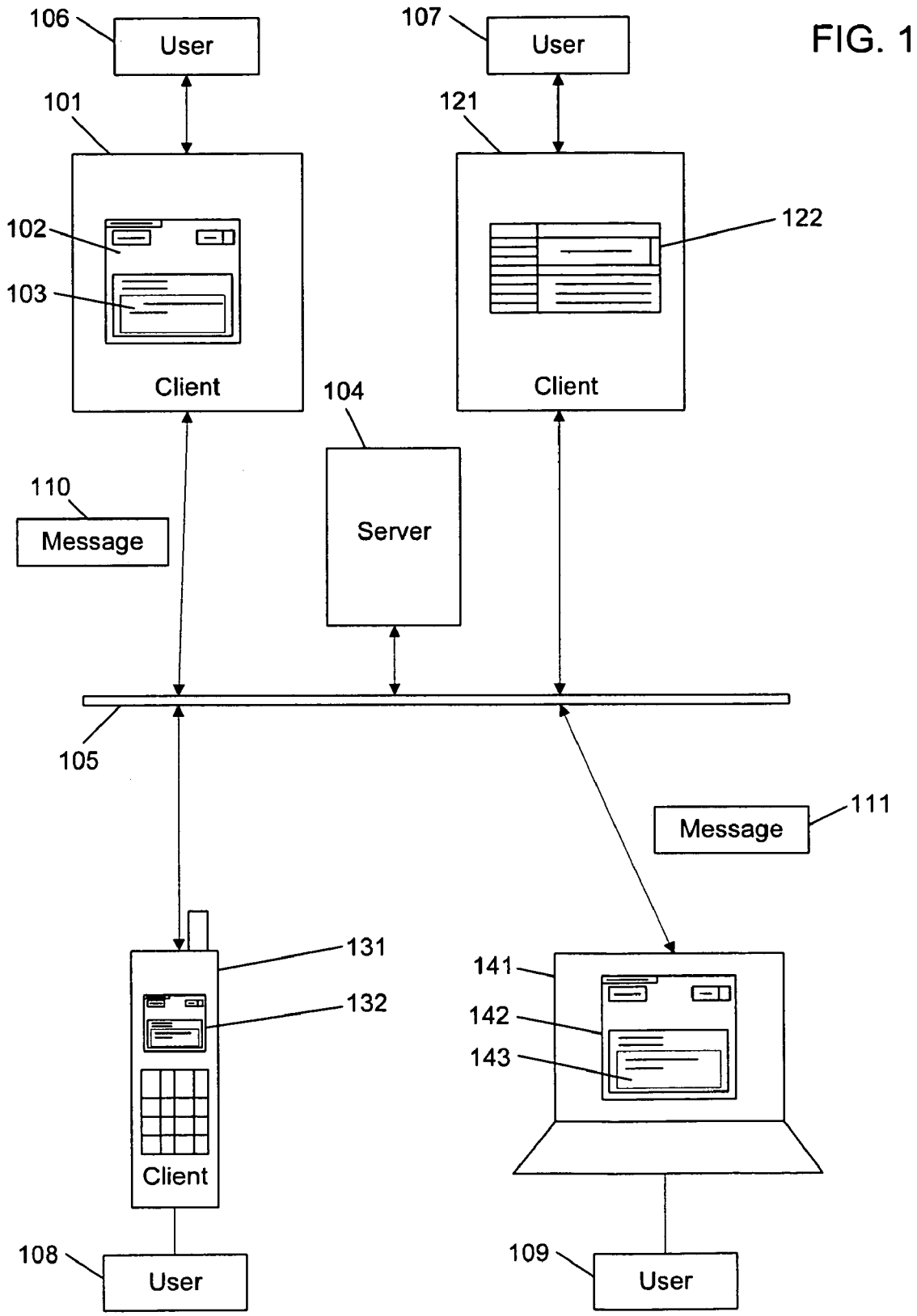
FIG. 1 illustrates an exemplary environment and communication devices according to one example.

FIG. 1 illustrates an exemplary environment and several communication devices, including computers 101 and 111, a cellular phone 131, and a mobile computer 141, in communication with a communication server 104, e.g., a mail server, via a network 105, e.g., Ethernet, IEEE 802.11b wireless, or the like, according to one embodiment of the invention. The communication device 101 may be, for example, a desktop computer, and includes an integrated communication interface 102.

The integrated communication interface 102 includes a user interface displayed on computer 101 by computer-executable code running on the computer 101. The user interface may be responsive to input from a keyboard and mouse (not shown) associated with the computer 101. A portion of communication interface 102 may also include executable code running on or provided by communication server 104. The integrated communication interface allows a user 106 to interact with a communication device such as the computer 101 to send and receive electronic messages such as Message 110 to and from other communication devices on the network 105 using a variety of communication methods. Examples of communication methods include electronic mail (email), instant messaging (IM), Short Message Service (SMS), chat, voice, Voice Over IP (VOIP), telephone, and the like.

A desktop computer 121 includes an email client 122, e.g., Microsoft Outlook™, Yahoo Mail, or the like, which can send and receive messages on behalf of a user 107 using the email communication method to and from other communication devices on the network 105. A cellular phone 131 includes a mobile version of the integrated communication interface 132 which can send and receive messages on behalf of a user 108, and a laptop computer 141 includes an integrated communication interface 142, which can send and receive messages on behalf of a user 109, according to one example.

The integrated communication interface 102 allows a user 106 to compose, send, receive, and reply to electronic messages 110 using any communication method supported by communication device 101. The integrated communication interface 102 includes a message display 103, which displays an electronic message. The communication device 101 sends electronic messages 110 via the network 105 to other communication devices, e.g., to the desktop computer 121, the mobile phone 131, and the laptop computer 141, which receive the messages.

When a communication device such as the laptop computer 141 receives an electronic message 111 using any communication method supported by the device, e.g., email, IM, SMS, chat, voice, and the like, the message 111 can be presented to a user 109 via the integrated communication interface 142, which displays the message as a displayed message 143.

Figure 2:
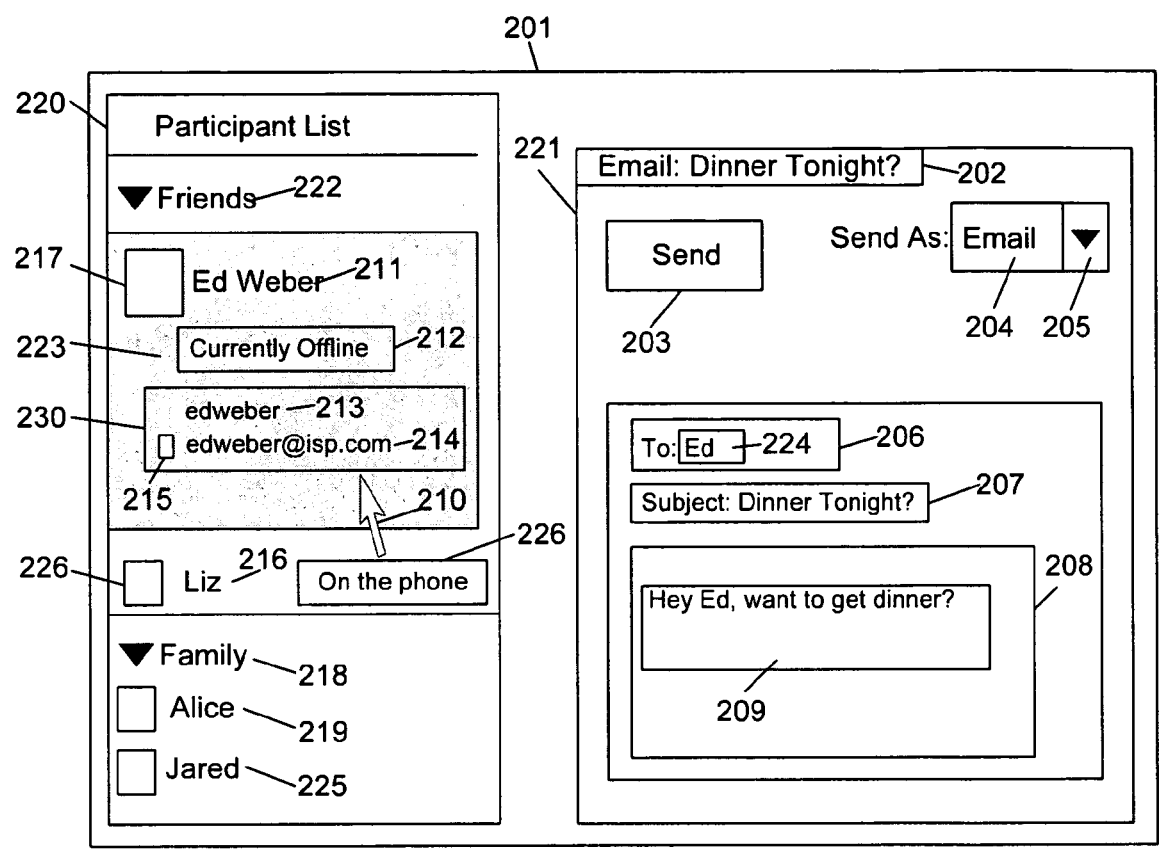
FIGS. 2-6 illustrate integrated communication interfaces according to some examples.

FIG. 2 is an illustrative drawing of an integrated communication interface 201 according to one embodiment of the invention. The integrated communication interface 201 may be displayed, for example, in one or more windows on a computer screen, or in a Web browser. The integrated communication interface 201 includes participant listing logic 220 and multi-protocol messaging interface logic 221, both of which include logic for generating a user interface on a computer or similar programmable device. The participant listing logic 220 and the messaging interface logic 221 may include computer program code in HyperText Markup Language (HTML), JavaScript®, Java®, combinations thereof, or any other form of computer-executable code, for causing the user interface elements shown in FIG. 2 to be displayed to a user and to accept user interactions. In particular, the participant listing logic 220 and the messaging interface logic 221 may be displayed, for example, as windows on a computer screen, or in a Web browser. The participant listing logic 220 displays the names of participants. The participant names are grouped into categories, such as a Friends category 222 and a Family category 218. The Friends category 222 contains a participant named Ed Weber 211 and a participant named Liz 216. The Family category 218 contains a participant named Alice 219 and a participant named Jared 225. A user can select a participant name with a mouse pointer 210 to display details about the participant with the selected name. A participant name Ed Weber 211 in the Friends category 222 has been selected, and participant details 223 associated with the participant Ed Weber are displayed in the participant listing logic 220. The participant details 223 include an image or avatar 217, an online presence indicator 212, which indicates whether Ed Weber is currently online or offline.

The participant details 223 also include a communication method list 230, which includes an instant messaging address 213 and an email address 214. The communication method list 230 may be presented in an order based on preference, online presence, or a combination of preference and presence. The order may be according to preference information provided by the participant, which indicates the communication method(s) by which the participant prefers to be contacted or prefers not to be contacted. The ordering of the communication method list 230 may also be based on the online presence of the participant. The list 230 may be ordered, for example, so that methods by which the participant prefers to be contacted, and for which the participant is online, appear at the top of the list 230, and other methods appear at the bottom of the list. In another example, methods by which the participant does not wish to be contacted do not appear in the list 230. The list 230 may include a separate presence indicator (not shown) for each communication method.

The participant details 223 also include a default address indicator 215, which is displayed next to a default address, which is an address to which a message will be sent by default. There is one default address, and the default address indicator is associated with one of the addresses in the communication address list 230. In this example, the default address indicator 215 is displayed next to the email address 214, which indicates that messages sent using the integrated communication interface 201 will be sent to the email address 214 using the Email communication method by default. A user can change the default address by clicking on an area to the left of the email address displayed in participant details 223 using the mouse pointer 210. For example, clicking on the instant messaging address 213 would initiate a conversation using instant messaging address 213, but would not necessarily change the default address. When a user clicks on an address such as the instant messaging address 213, the messaging interface logic 221 will be displayed and configured for sending a message to the participant associated with the address, e.g. Ed Weber 211, using the selected address, e.g. the instant messaging address 213.

The messaging interface logic 221 includes instructions for creating a text input field with editing capability 208 for composing an input content 209, a selected communication method 204, which is Email in this example, and a communication method selector 205 for selecting a communication method 204. The text input field 208 may be invoked, i.e., created, configured, and accessed, by the messaging interface logic 221, e.g. as a JavaScript® user interface component, and displayed in a location on a Web page as specified by the messaging interface logic 221. The other user interface features shown in FIG. 2 are similarly created, configured, and accessed according to instructions in the messaging interface logic 221 and the participant listing logic 220. The communication method selector 205 is illustrated as a drop-down menu, but may alternatively be a radio button list, a pop-up-list, or any other user interface component that can be used to specify a communication method. The communication method selector 205 is created and configured by display logic included in the messaging interface logic 221. The selected communication method 204 is used when the input content 209 is sent as an outgoing message (not shown). A user can send the input content 209 using the selected communication method 204 to a recipient 224 specified in a "To" field 206 by clicking a mouse button (not shown) when the mouse pointer 210 is positioned over a Send button 203. The Send button 203 is sometimes referred to herein as messaging logic for initiating transmission of the input content 209. The communication method 204 may be, for example, Email, IM, SMS, or the like. The integrated communication interface will then cause the input content 209 to be sent via a messaging protocol, e.g., Email, to a protocol address, e.g., an Email address, associated with the recipient 224. A user may select a recipient 224 from the list displayed by the participant listing logic 220 at any time before sending the outgoing message. Multiple recipients 224 may be associated with a single message by selecting multiple recipients from the participant listing logic 220.

The messaging interface logic 221 may include additional elements that are specific to the selected communication method. In this example, the messaging interface logic 221 further includes additional elements specific to the Email communication method, including an Email subject window title 202 and a Subject field 207. The values shown for the Subject field 207 ("Dinner Tonight?") and the input content 209 ("Hey Ed, want to get dinner?") may be provided by a user when a message is composed, or may be filled in by the integrated communication interface 201 based on corresponding values in a received message.

A user may select a participant from the participant listing logic 220 to whom a message is to be composed, and the messaging interface logic 221 will be displayed with the recipient 224 set to the selected participant and a communication method set to the default communication method of the selected participant. That is, the messaging interface logic 221 will be displayed and configured for sending a message to the selected participant using the default communication method of the selected participant. For example, a user can begin composing a message to Ed Weber by clicking a mouse button while the mouse pointer 210 is positioned in an area associated with Ed Weber, such as the participant details 223. As a result, the messaging interface logic 221 would be displayed, with the recipient 224 set to Ed and the communication method 204 set to Email. Similarly, a user could begin composing a message to Liz by clicking on a participant Liz 216, which would result in the messaging interface logic 221 being displayed with recipient set to Liz and a communication method field set to the default communication method associated with Liz, which may be, for example, Short Message Service (SMS). After a message has been composed using the messaging interface logic 221, e.g., by typing text in text input field 208, the message can be sent, e.g., by clicking the Send button 203, as described above.

The online presence indicator 212 displays online presence information, which indicates whether the participant is currently on line. The integrated communication interface 201 automatically updates the online presence indicator 212 as the associated participant's online presence changes. A user can use the online presence indicator 212 to choose the best communication method to use for sending a message to a particular participant. For example, the online presence indicator 212 indicates that Ed Weber is currently offline, and therefore will not immediately receive instant messages, which require the recipient to be online for immediate receipt. Therefore, the user chooses to send messages via email, since the benefit of immediate receipt will not be realized, and email messages may have advantages over instant messages when the recipient is not online. For example, the recipient may be more likely to read email before reading instant messages, and email messages may contain more information than instant messages.

Each participant in the participant listing logic 220 may be displayed by the integrated communication interface 201 in a brief summary format, as illustrated by the participants Liz 216 and Alice 219, or in a detail format, as illustrated by the participant details 223 for Ed Weber 211. In the brief summary format, an image or avatar 226 and an online presence indicator 227 may be displayed alongside a participant name 216. For example, for the participant Liz 216, the online presence indicator is "on the phone" 227.

Figure 3:
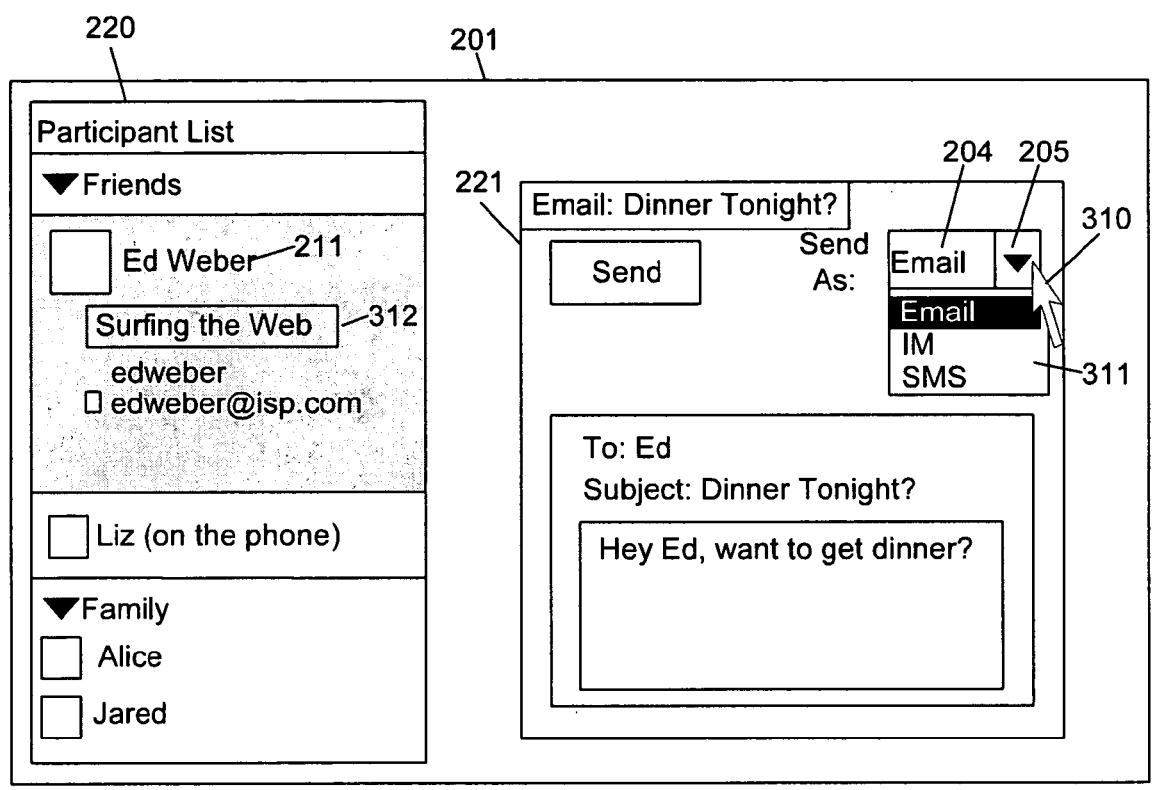

In FIG. 3, an online presence indicator 312 indicates that Ed Weber is now "Surfing the Web", which means that he is now online, and will receive instant messages soon after they are sent. Therefore, the user composing the message in the messaging interface logic 221 changes the communication method 204 to instant messaging (IM). To change the selected communication method 204, the user places a mouse pointer 310 over a communication method selector 305 and performs a selection action such as pressing a mouse button, which causes a menu 311 of communication methods to appear. The user can then select a new communication method from the menu 311. The communication method selector 205 is sometimes referred to herein as communication method selection logic for enabling selection of a communication method from the list of communication methods in the menu 311. The menu 311 is sometimes referred to herein as display logic.

Figure 4:
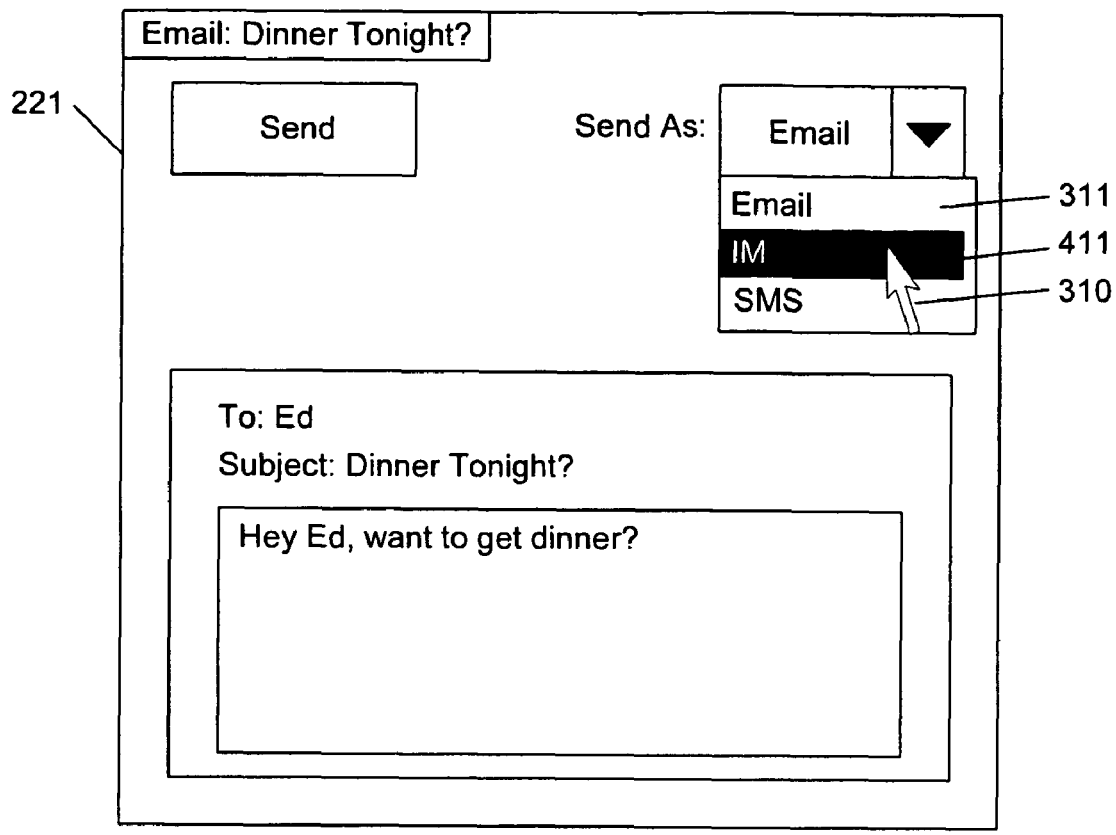
Figure 5:
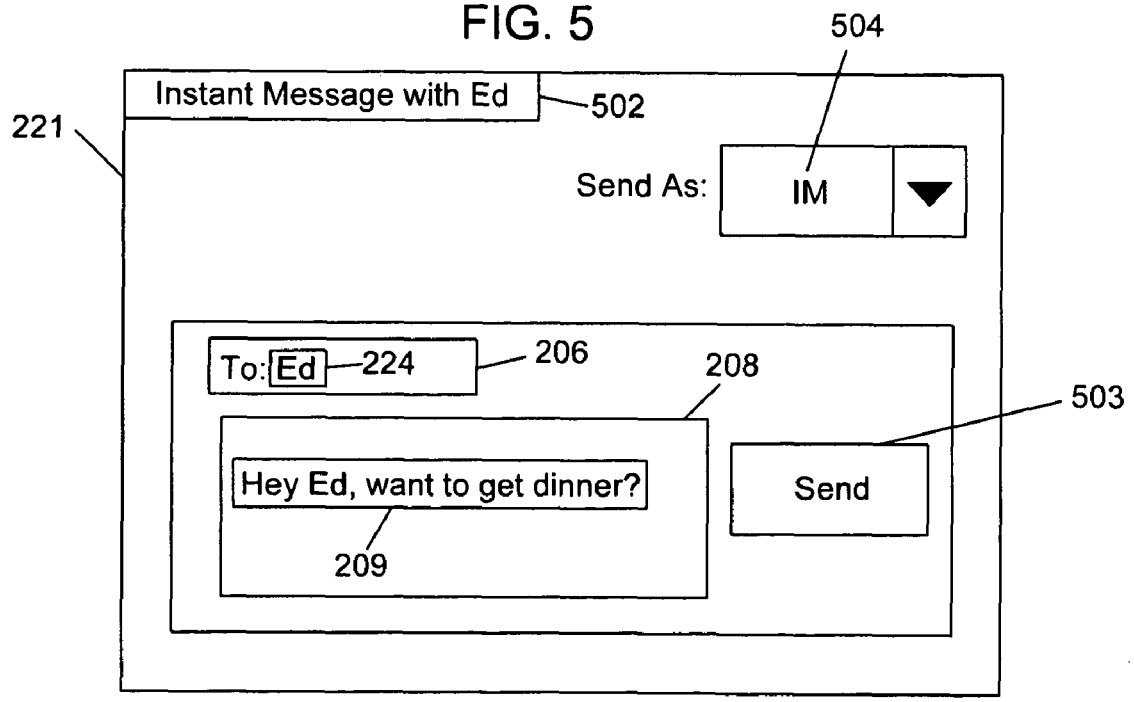
Figure 6:
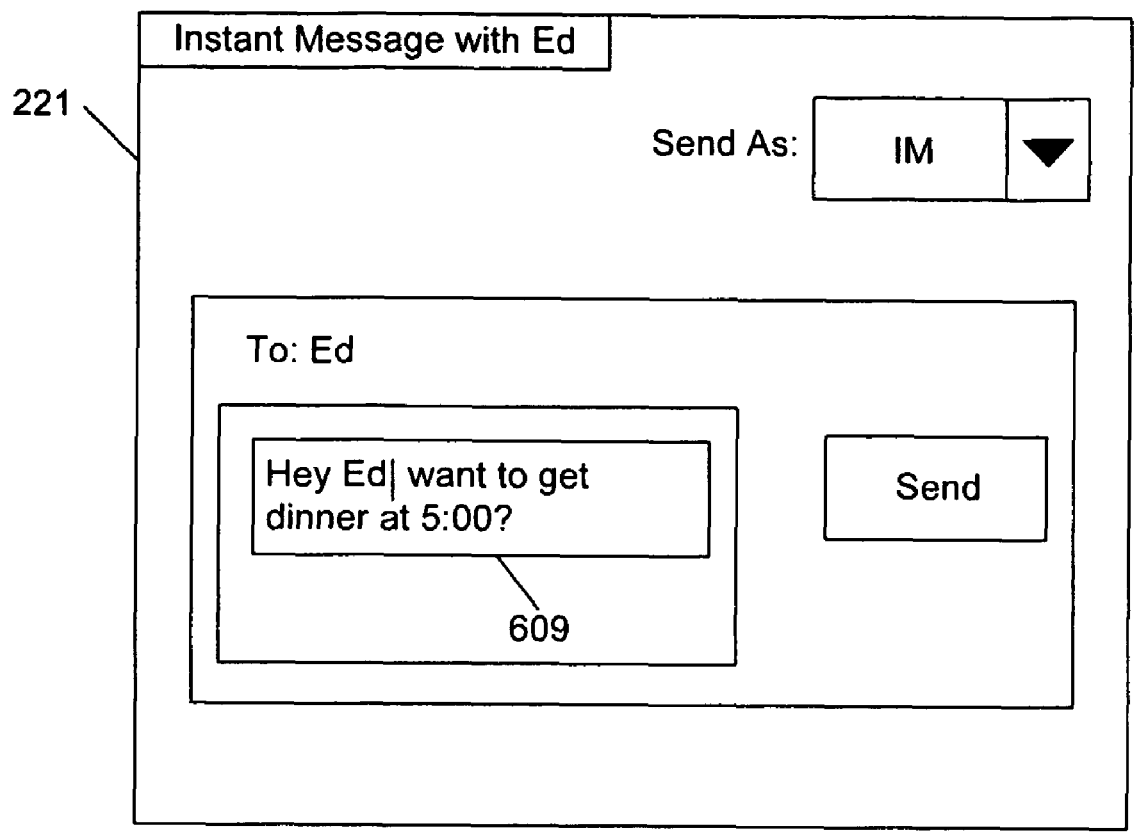

In FIG. 4, the user selects the instant messaging communication method (IM) by pointing to a corresponding area 411 of the menu 311 with the mouse pointer 310 and, for example, pressing a mouse button. In FIG. 5, the user has completed selection of the new communication method, and the new communication method name, IM, now appears as the communication method name 504. The user interface has changed to reflect the new communication method. Specifically, the interface window title 502 has changed to indicate that an instant message is being composed, the Subject field 207 has disappeared, and the position of the Send button 503 has changed. Other user interface changes may occur in addition to those shown. Additionally, in some examples, the Subject field 207 may remain and/or become shaded, and other fields may appear or disappear when a new communication method is selected. The recipient 224 has not changed. If a recipient's communication address (not shown), e.g., an email address, were displayed by the interface, the communication address would change when a different communication method is selected. However, despite the change in communication method, the input content 209 has not changed, i.e. the input content 209 has not been altered. Furthermore, as shown in FIG. 6, the user can continue to compose the message by adding additional text content to the existing content, in which the user has added the additional text "at 5:00?" to produce an updated text content 609. Most other attributes of the message, including content such as attachments (not shown), also remain unchanged when the communication method is changed.

Figure 7:
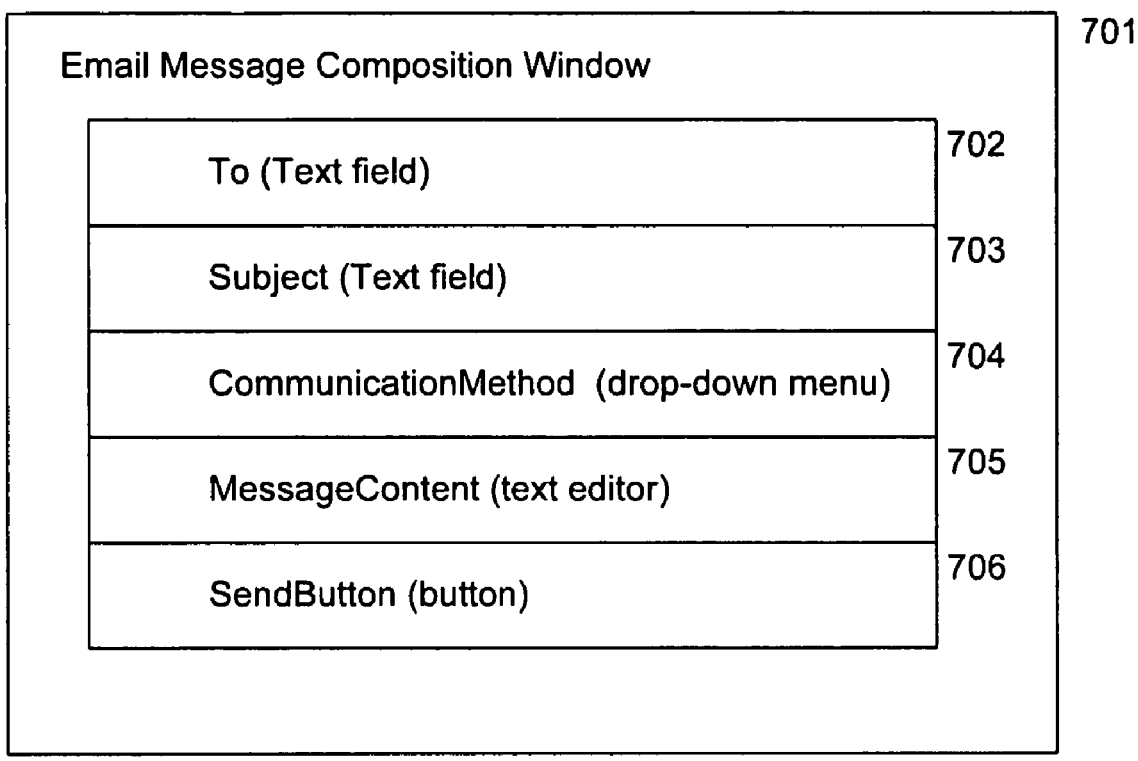
FIGS. 7-8 illustrate integrated communication interface components according to some examples.
Figure 8:
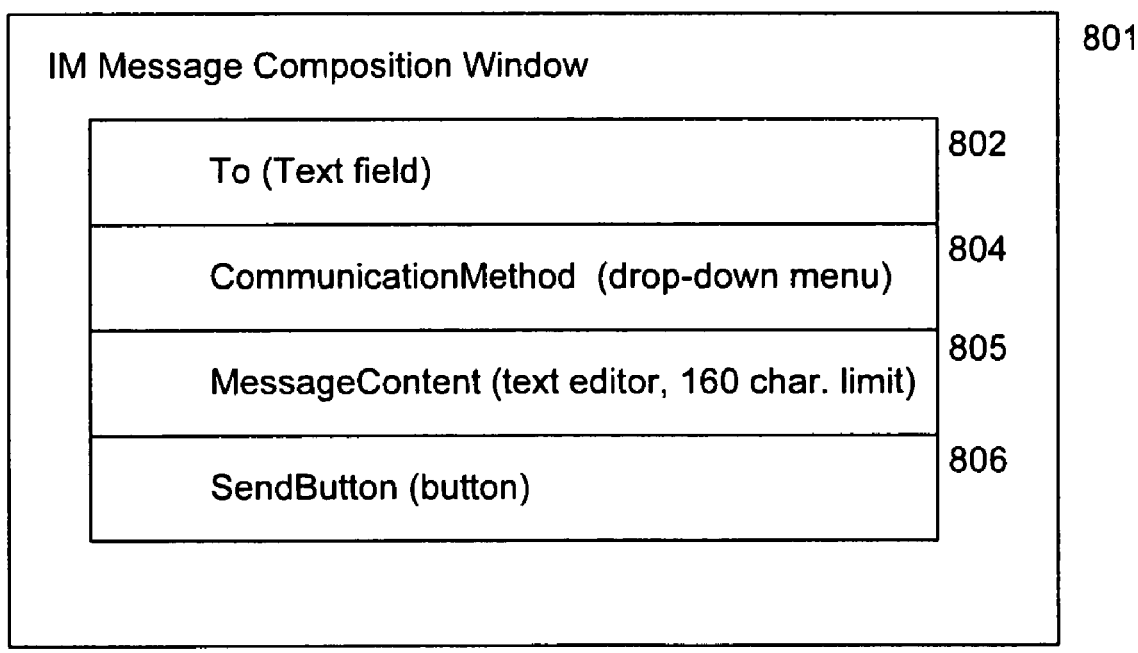

FIGS. 7 and 8 show the components of an integrated communication interface according to two examples. These components generally receive and store values associated with the interface, or respond to user actions. These components may be implemented using a user interface framework, e.g., HTML and JavaScript®, Microsoft .NET® or the like. FIG. 7 shows the components of an integrated communication interface for an Email communication method according to one example. The interface includes email messaging interface logic 701 which contains a To text field 702, a Subject text field 703, a CommunicationMethod drop-down menu 704, a MessageContent text input field with editing capability 705, and a SendButton button 706. Although the message content is text in this example, other types of message content, including voice and data, are possible and contemplated. The message may also include attachments. In some examples, attachments would be treated similarly to the message content. In one example, changes to the communication method would not affect any attachments associated with an email message. In another example, any conversion or transformation performed on the message content as a result of changing the communication would also be performed on any attachments associated with the message.

FIG. 8 shows the components of an integrated communication interface for an IM communication method according to one example. The interface includes IM messaging interface logic 801 which contains a To text field 802, a CommunicationMethod drop-down menu 804, a MessageContent text input field with editing capability 805, and a SendButton button 806.

Figure 9:
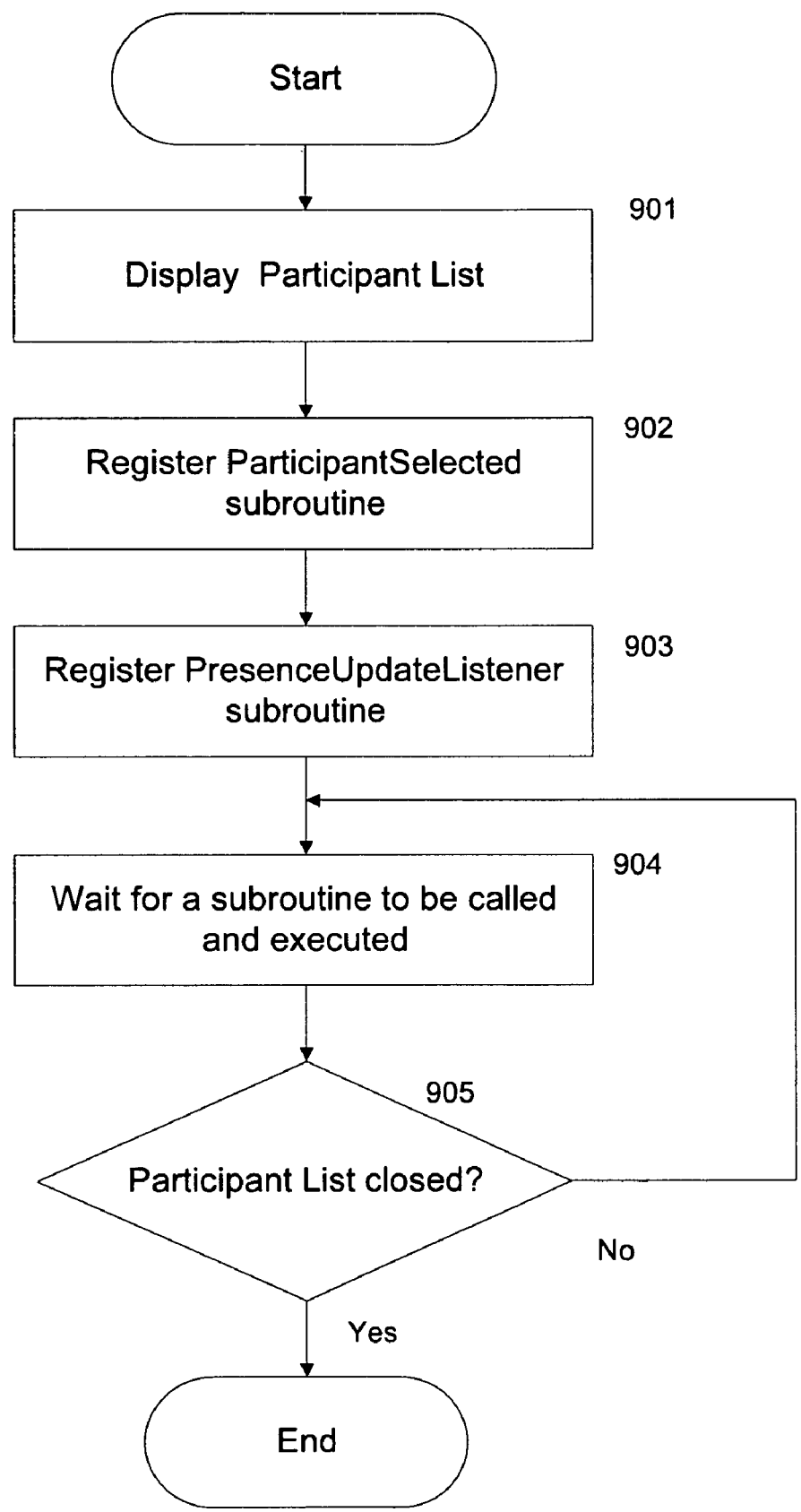
FIG. 9 is a flowchart illustrating a method of providing an integrated communication interface according to one example.

FIG. 9 is a flowchart illustrating a method of providing an integrated communication interface according to one example. With reference to FIG. 2, this method and the subroutines it calls displays the integrated communication interface 201, including the participant listing logic 220 and the messaging interface logic 221. This method and its subroutines then wait for user input, such as selection of the participant 223, selection of the communication method 204, and pressing of the Send button 203, and take the corresponding actions, such as opening the messaging interface logic 221, changing the communication method 204, and sending the message with the current communication method 204, respectively. This method and the subroutines it calls are described in terms of an event-callback model, in which subroutines that process events such as user interface button presses are registered to be called when those events occur. This approach is used because these events may occur at any time, and the description is simplified by describing the steps to be taken in response to these events, without describing the details of how the events are generated or received, because such details depend on a particular user interface technology used to implement the methods. The callback subroutine approach illustrates one example of how to process input. In other examples, the user input may be received in a Web page and extracted from components on the Web page, in which case the subroutine methods described herein may be called to process the corresponding component values. In general, the details of how input is processed, as well as how the interface windows are created and displayed, are dependent on a specific user interface framework or library, and are known to those skilled in the art.

The method of FIG. 9 begins at block 901 by displaying the participant listing logic 220. In particular, block 901 adds the names of known participants to a list of participants, and also adds a default communication method to the participant list for each participant. Next, at block 902, a ParticipantSelected subroutine is registered to be called when the user selects a participant from the participant listing logic 220, e.g., by selecting on a participant name or image with a mouse. The ParticipantSelected subroutine performs the appropriate actions in response to the user's selection of a participant, as described below. At block 903, a PresenceUpdateListener subroutine is registered to be called when a change to a participant's online presence information is detected. The PresenceUpdateListener is described below with reference to FIG. 11. Finally, the method of FIG. 9 waits a block 904 for a subroutine to be called to process user actions such as selection of a participant. At block 905, the method checks if the user has closed the participant list, e.g., by closing a window. If the list has been closed, the method exits; otherwise, the method continues to wait for user events until the participant list is closed.

Figure 10:
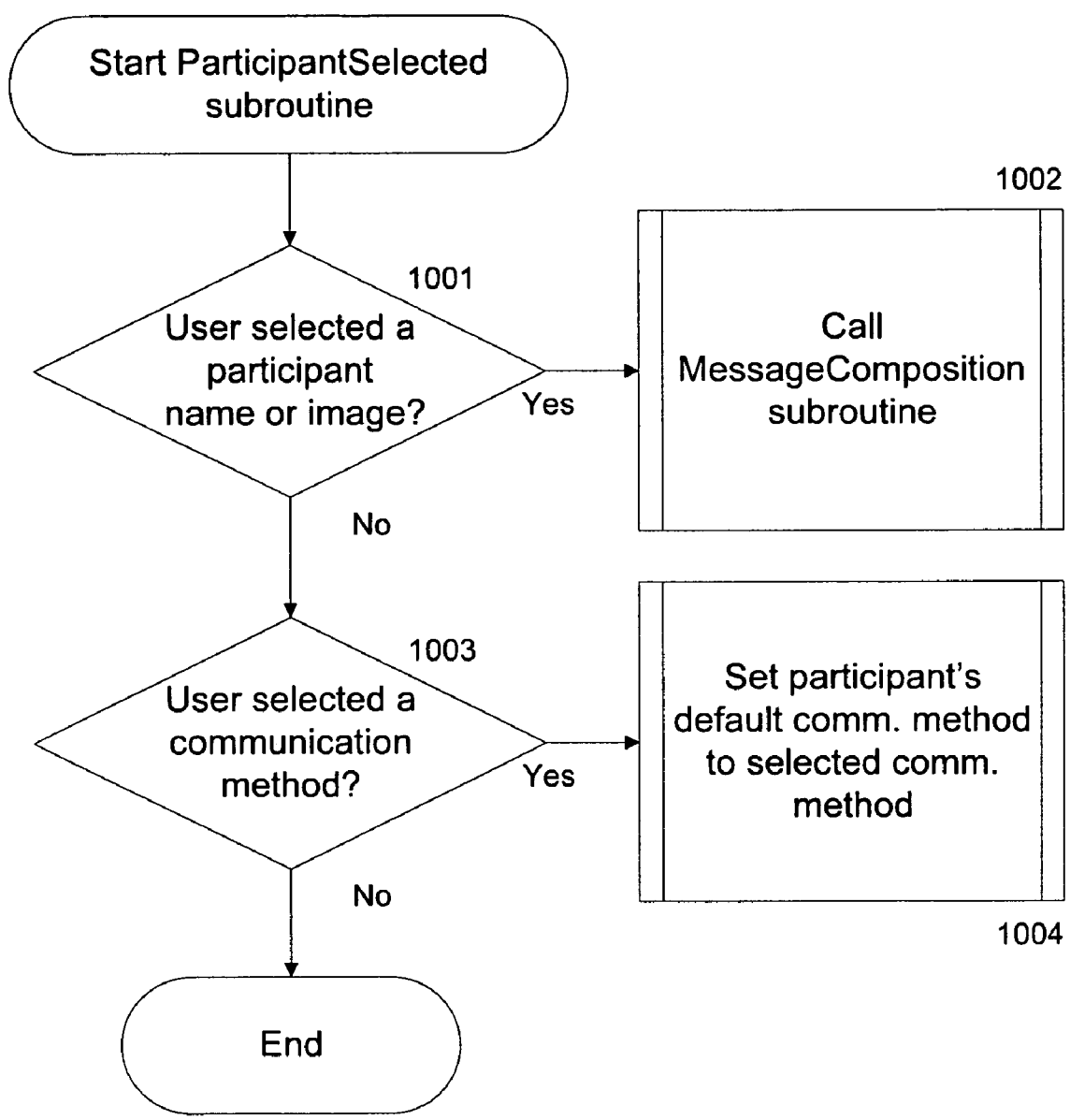
FIG. 10 is a flowchart illustrating a method of providing an interactive participant list according to one example.

FIG. 10 is a flowchart illustrating a method of providing an interactive participant list according to one example. The method of FIG. 10 is a subroutine named ParticipantSelected, which is registered by the method of FIG. 9 to be called when a user selects a participant from the participant listing logic 220 of FIG. 2. The ParticipantSelected subroutine is called, e.g., by a windowing system or user interface framework, when a user selects a participant, e.g., by clicking a mouse when a mouse pointer is positioned in a screen region associated with a participant, such as the region surrounding participant details 223 of FIG. 2. The method determines whether the user selected the participant itself, e.g., participant name 211 or image 217, or a communication method associated with the participant, e.g., an address in the communication method list 230, and takes the appropriate action. Specifically, at block 1001, the method determines whether the user has selected, e.g., clicked on, a participant name or image. If so, at block 1002 the method calls the MessageComposition subroutine to activate messaging interface logic 221 for composing a message to the participant. The identity of the selected participant and a default communication method associated with the participant as parameters to the MessageComposition subroutine. Otherwise, block 1003 determines whether the user has selected a communication method, e.g., by clicking on a communication method such as the email address 214 in the participant details 223. If so, at block 1004, the default communication method associated with the participant is set to the selected method, e.g., the method on which the user clicked. Blocks 1003 and 1004 are sometimes referred to herein as communication method selection logic. Block 1004 also causes a default communication method indicator 215 to appear next to the default communication method in the participant list user interface 220 of FIG. 2. The subroutine is now complete and returns to its caller.

Figure 11:
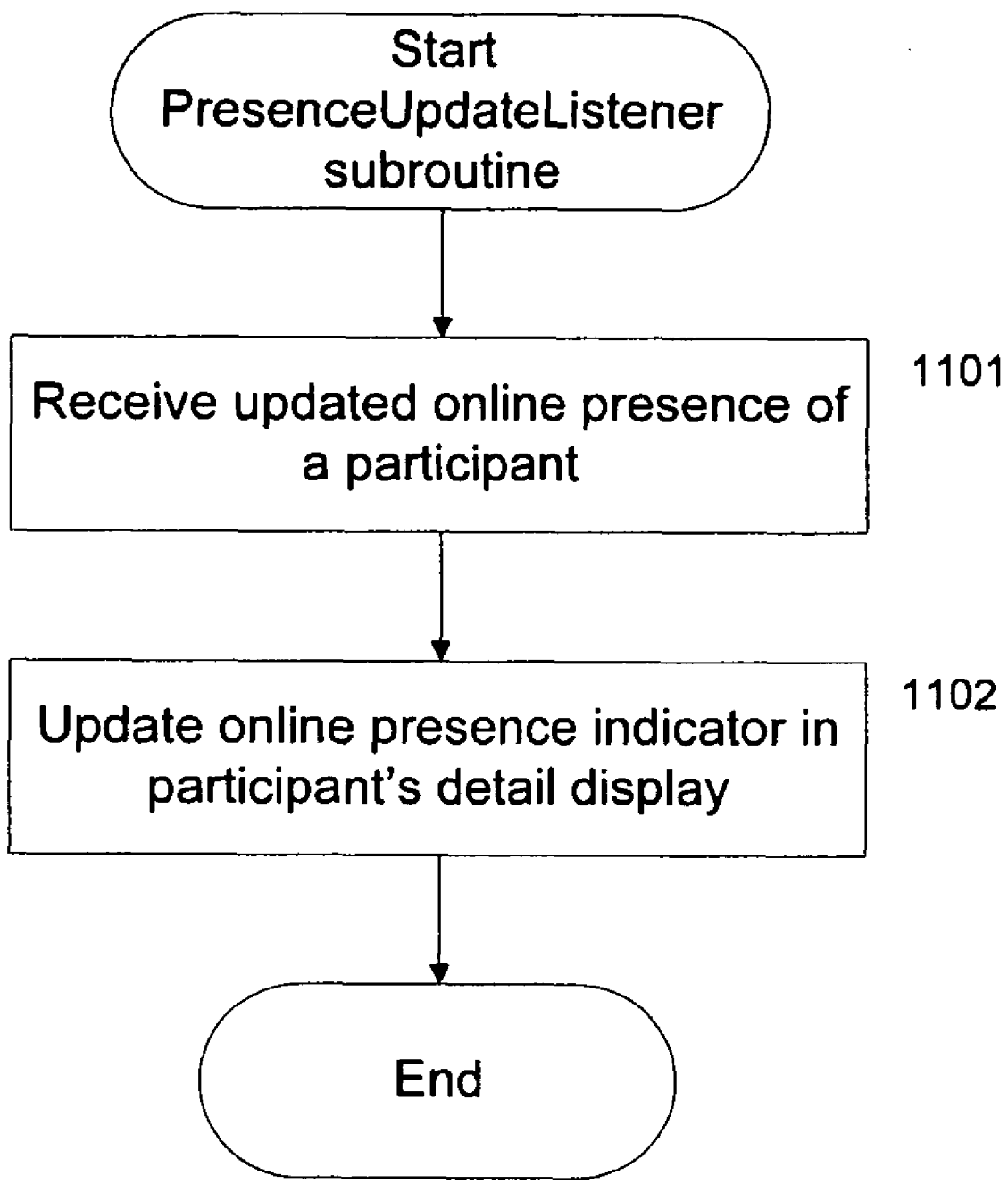
FIG. 11 is a flowchart illustrating a method of providing an online presence indicator according to one example.

FIG. 11 is a flowchart illustrating a method of providing an online presence indicator according to one example. The method of FIG. 11 is a subroutine named PresenceUpdateListener which is registered by the method of FIG. 9 to be called when the online presence of a participant is updated. Alternatively, the PresenceUpdateListener subroutine may be called at some other time, e.g., when the user interface display is refreshed, or at a periodic interval. The PresenceUpdateListener subroutine displays an online presence indicator by receiving online presence updates at block 1101 from an online presence tracker and updating an online presence indicator at block 1102 to display the current online presence of a participant, e.g., online or offline. An online presence tracker may be a server, e.g., a Web server, or a database, or may be received and delivered by an underlying infrastructure using, for example, a network protocol or communication method for sending information updates via a network. As an example, with reference to FIG. 1, when the online presence of a user 106 changes, the computer or server, such as the server 104, to which the user has logged in or logged out updates the user's online presence and sends the updated online presence information to clients such as the cell phone 131 and the laptop computer 141. The method of FIG. 11 processes online presence updates.

Figure 12:
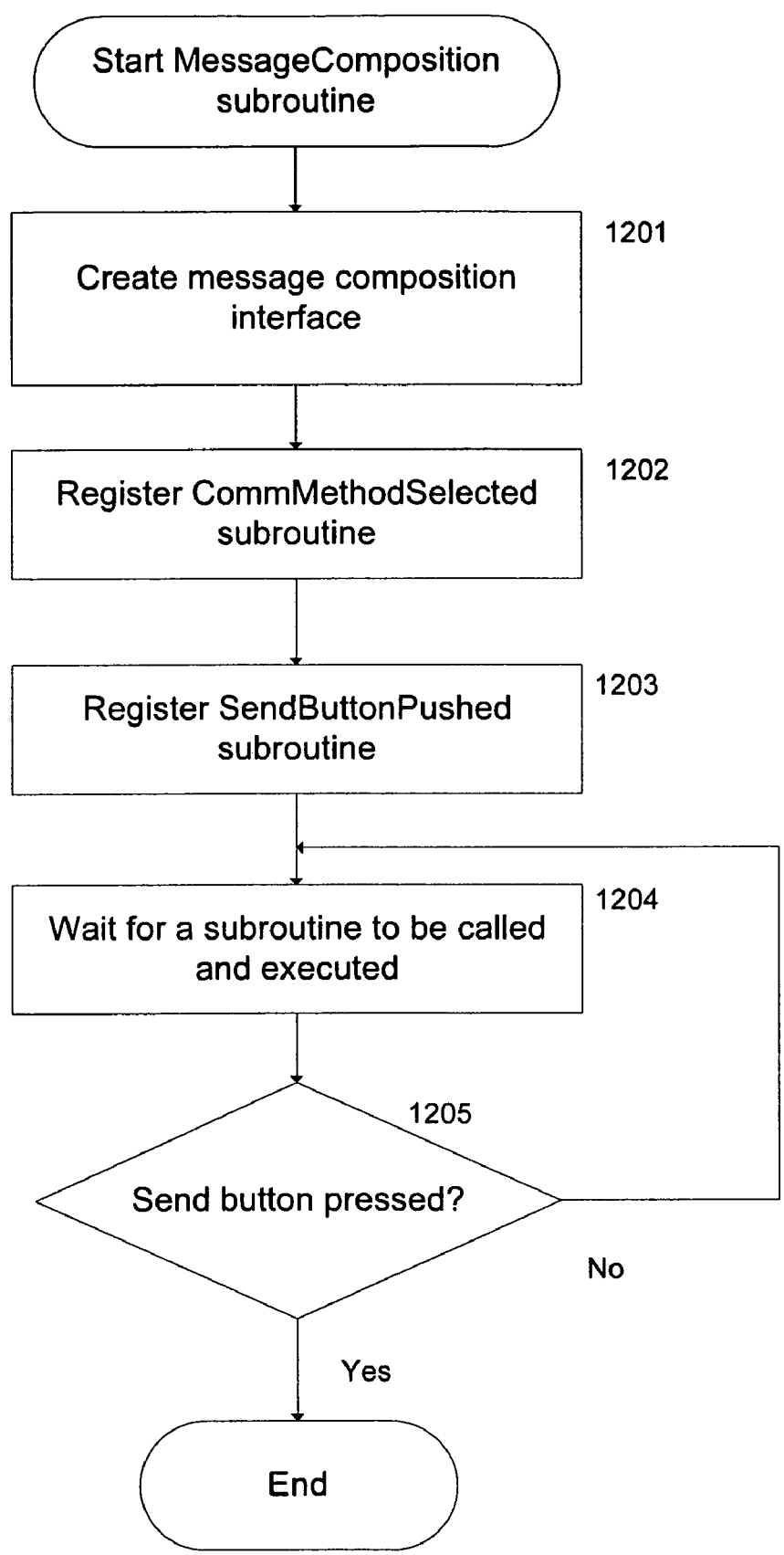

FIG. 12 is a flowchart illustrating a method of providing the messaging interface logic 221 of FIG. 2 according to one example. The method of FIG. 12 is a subroutine named MessageComposition, which provides the messaging interface logic by creating a window for the messaging interface logic, registering subroutines, sometimes referred to herein as callback subroutines, to be called when a user performs actions, and finally waiting for the user to perform actions. The components displayed in the messaging interface logic may vary according to the communication method. The messaging interface logic is associated with a default communication method on which the interface's initial appearance is based. For example, with reference to the Email message composition window structure of FIG. 7, if the default communication method is Email, the messaging interface logic initially includes the MessageContent field 705, the CommunicationMethod field 704, the To field 702, the Subject field 703, and the Send button 706. The messaging interface logic may be displayed as a single window, or may be displayed as part of a window that also displays a participant list similar to the participant listing logic 220 of FIG. 2, or may be displayed in multiple windows. The MessageComposition subroutine of FIG. 12 begins by creating messaging interface logic at block 1201, including the user interface components described previously. In particular, block 1201 creates the list of communication methods in the CommunicationMethod field 704 by adding a communication method name to the list of communication methods for each communication method that is known to be available. For example, block 1201 might add the communication method names Email, IM, and SMS to the CommunicationMethod field 704. Next, the CommMethodSelected and SendButtonPushed callback subroutines are registered at blocks 1202 and 1203, respectively, to be called when the corresponding events occur, i.e., when a communication method is selected in the CommunicationMethod drop down menu, or when the SendButton is pressed, respectively.

After the callback subroutines have been registered, the subroutine of FIG. 12 waits at block 1204 for user input by waiting for the callback subroutines to be called and executed. The user interface framework automatically calls and executes the appropriate callback subroutine when the associated user input occurs. After the callback subroutine has finished executing, a check is performed at block 1205 to determine if the Send button was pressed. If the Send button was not pressed, the subroutine continues to wait at block 1204 for user input until the Send button is pressed or the window is closed. Finally, the method terminates and the messaging interface logic created at block 1201 closes.

Figure 13:
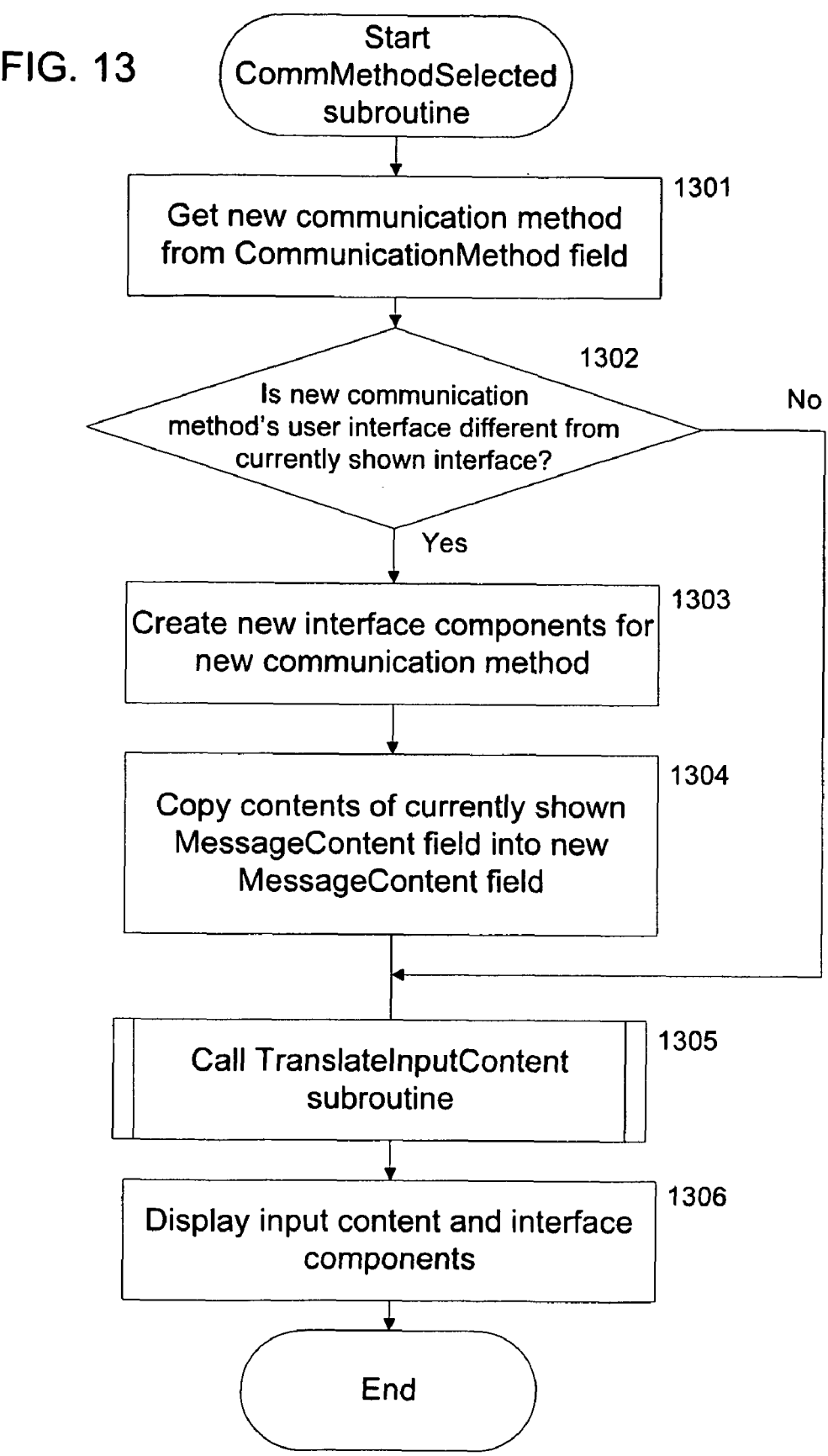

FIG. 13 is a flowchart illustrating a subroutine, CommMethodSelected, which implements selection of different communication methods (i.e., messaging protocols) in the messaging interface logic 221 of FIG. 2, according to one example. The CommMethodSelected subroutine is sometimes referred to herein as communication method selection logic. The CommMethodSelected subroutine provides the features of varying the components displayed in the messaging interface logic 221 according to the communication method, and of ensuring that the message contents do not change when the communication method is changed. First, at block 1302, the CommMethodSelected subroutine checks if the new communication method has a different interface than the previous (i.e., currently displayed) communication method. If the interface is different, then new user interface components are created as needed at block 1303 for the new communication method. If a new MessageContent field is created, then at block 1304 the content, e.g., text, of the previous MessageContent field is copied or mapped into the new MessageContent field, to ensure that the message content does not change when the communication method is changed. At block 1305, a TranslateInputContent subroutine is called. If the text content type has changed from text to voice or vice versa, the TranslateInputContent subroutine accordingly translates the content from text to voice or vice versa. For example, if the communication method were changed from Email to voicemail, and the previous field contained email text, then the email text would be converted to encoded audio, e.g., by a voice synthesizer, and the encoded audio would be the content of the new field. Finally, at block 1306, the input content and the interface components are displayed, with any new interface components replacing the current interface components. If the input content type is voice, the input content may be displayed as a representation of voice data, e.g., as a summary of the voice data and the time duration of the voice data.

Although the methods of FIGS. 10 and 11 are described in terms of user interface components from which values, such as a recipient name, are extracted. The methods described these examples are applicable to a wide variety of user interface frameworks and libraries, such as Microsoft Windows, Java® Swing, and HTML with JavaScript® for Web-based clients. Although a callback subroutine model is described, the implementation does not necessarily require the use of callback subroutines. The subroutines described herein can be called at any appropriate time, for example, the subroutines can be called when a Web page has been received and is being processed to extract user input values from HTML or JavaScript® fields. In that case, component values may still be retrieved as shown in the methods of FIGS. 10 and 11, although the details of how or when the values are retrieved from the components may differ. In general, the methods and flowcharts presented herein are described in terms of a generic user interface model involving callback subroutines. This model is used as an example and the methods presented herein are not limited to use in this model.

Figure 14:
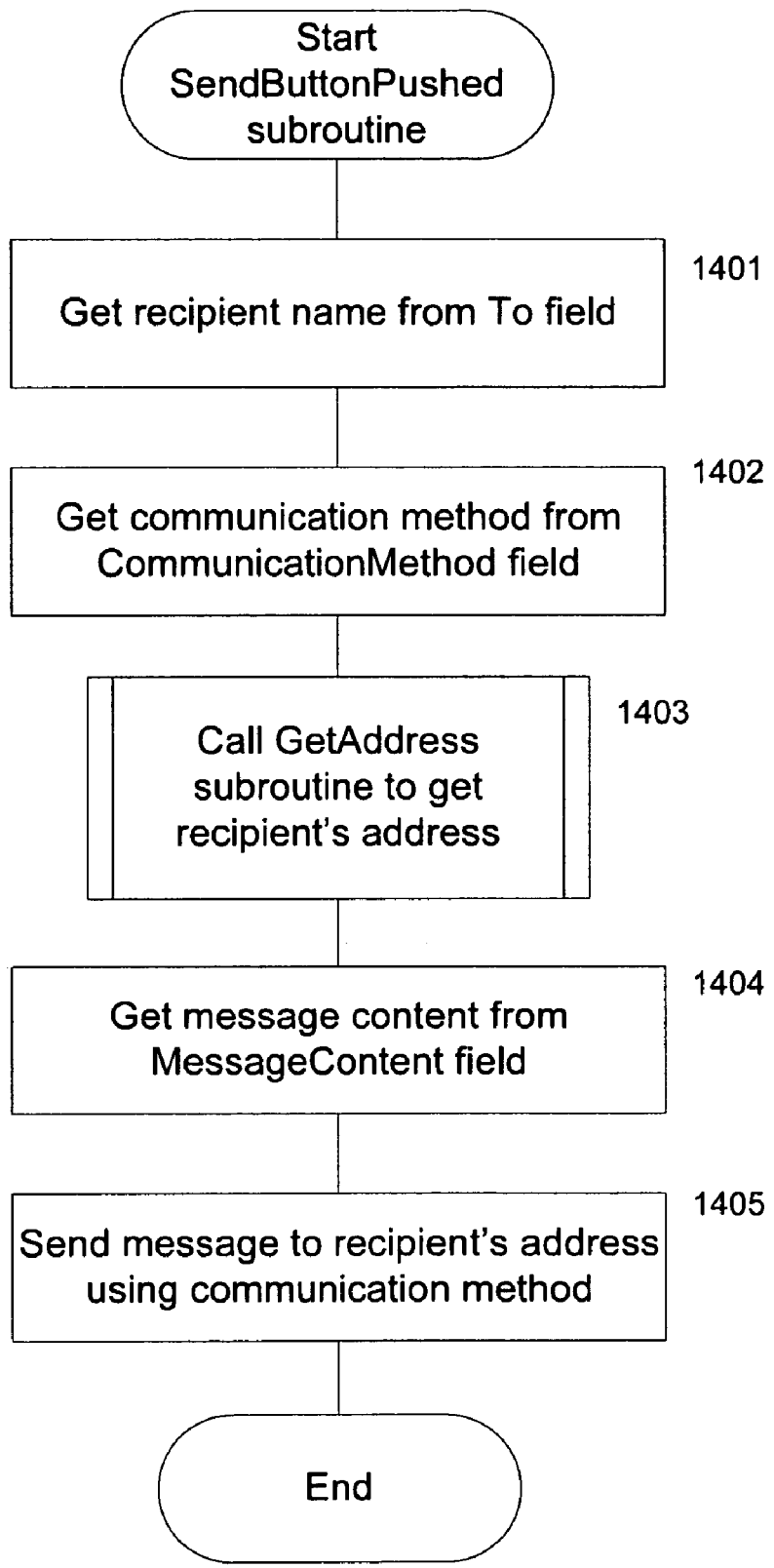

FIG. 14 is a flowchart illustrating a subroutine, SendButtonPushed, which implements sending of messages in messaging interface logic 221 of FIG. 2 according to one example. The SendButtonPushed subroutine is sometimes referred to herein as messaging logic for initiating transmission of input content. The SendButtonPushed subroutine provides the feature of sending the message to a specified participant using a selected communication method. First, at block 1401, the subroutine retrieves the specified participant name from the To field of the messaging interface logic 221. Next, block 1402 retrieves the selected communication method from the CommunicationMethod field. Block 1403 gets a protocol address for the participant, e.g., an email address, IM address, SMS number, or telephone number. The address is provided by the GetAddress subroutine, which converts a participant name and communication method to an address for the participant name. Next, at block 1404, the message content is retrieved from the MessageContent field. Finally, at block 1405, the message, including the message content, is sent by calling a messaging protocol send subroutine with the address and message content as parameters. The send subroutine may be, for example, a subroutine to send an email message, a subroutine to send an IM, a subroutine to send an SMS, or a subroutine to send a voicemail, depending on the communication method. Such send subroutines are available in subroutine libraries for languages such as JavaScript® and are well-known to those skilled in the art.

Figure 15:
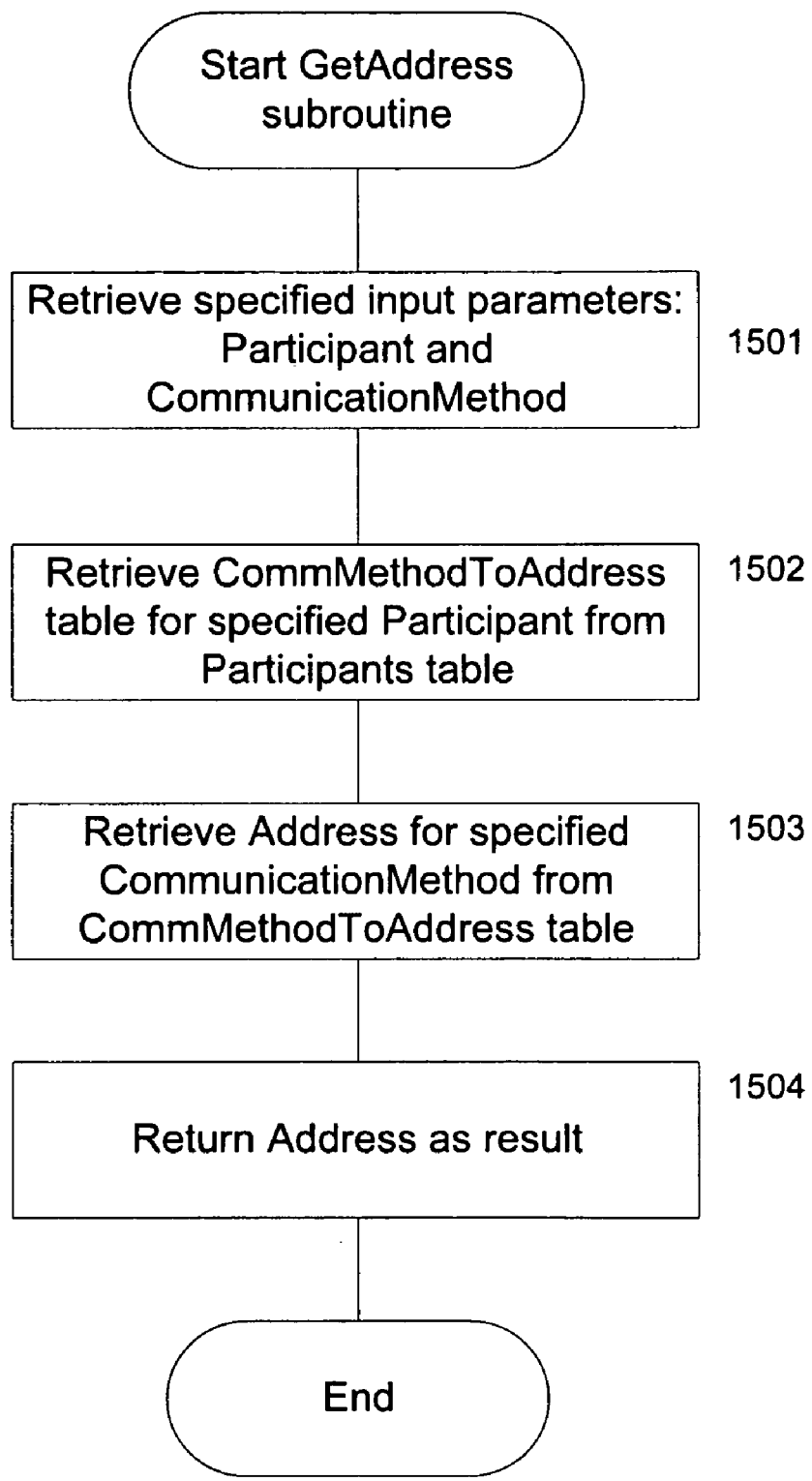

FIG. 15 is a flowchart illustrating a GetAddress subroutine that looks up a protocol-specific address for a participant according to one example. The GetAddress subroutine uses the data tables shown in FIGS. 17 and 18. These data tables may be implemented as, for example, data structures in a programming languages, and may be hash tables or the like. The data tables may alternatively be implemented as relational tables in a relational database.

FIG. 16 illustrates a Participants table 1601, and FIG. 17 illustrates a CommMethodToAddress table 1701, both used by the GetAddress subroutine to perform a two-step lookup of a protocol address, given a participant and communication method, according to one example. The GetAddress subroutine illustrated in FIG. 15 converts a participant name and a communication method to a protocol address using the Participants table 1601 of FIG. 16 and the CommMethodToAddress table 1701 of FIG. 17. The Participants table 1601 includes information associated with each participant entry 1602, including an associated CommMethodToAddress table 1603 that lists the communication methods and associated specific addresses associated with each participant entry 1602.

The Participants table 1601 in this example also includes an online presence value 1605 and a preference value 1606 associated with each participant 1602. The presence and preference values are updated, e.g., by a server, when the user's presence or preferences, respectively, are changed. For example, a user may change his or her preferences to indicate that Email is the preferred method of communication, and this preference change would be automatically propagated via, e.g., the network 105 and communication server 104 of FIG. 1 to the Participants table 1601. Similarly, when a participant's online presence changes, e.g., as a result of logging off, the presence change would be propagated to the Participants table 1601, where it is available for use by an integrated communication method.

With reference to FIG. 17, the CommMethodToAddress table 1701 stores an association of addresses to communication methods and allows for lookup of an address 1707 in a ProtocolAddress column 1706 that corresponds to a communication method 1709 in a CommMethod column 1705. The information stored in the CommMethodToAddress 1701 table may be provided, for example, by the user, or by a directory service, contact management system, or the like.

The GetAddress subroutine of FIG. 15 begins at block 1501 by retrieving its input parameters, which are the participant and communication method. Next, at block 1502, the subroutine searches the Participant column 1602 illustrated in FIG. 16 to find a row with a matching participant value 1608. The matching row's ParticipantData column 1603 contains a CommMethodToAddress table 1604 associated with the participant. At block 1503, the subroutine searches the CommMethod column 1705 of the associated CommMethodToAddress table 1604 retrieved from the Participants table 1601 to find a row with a matching communication method value 1709. The Address column 1706 of the matching row contains the value being searched for, which is a protocol address associated with the participant and communication method. Finally, at block 1504, the GetAddress subroutine returns the protocol address 1707 as a result.

Figure 18:
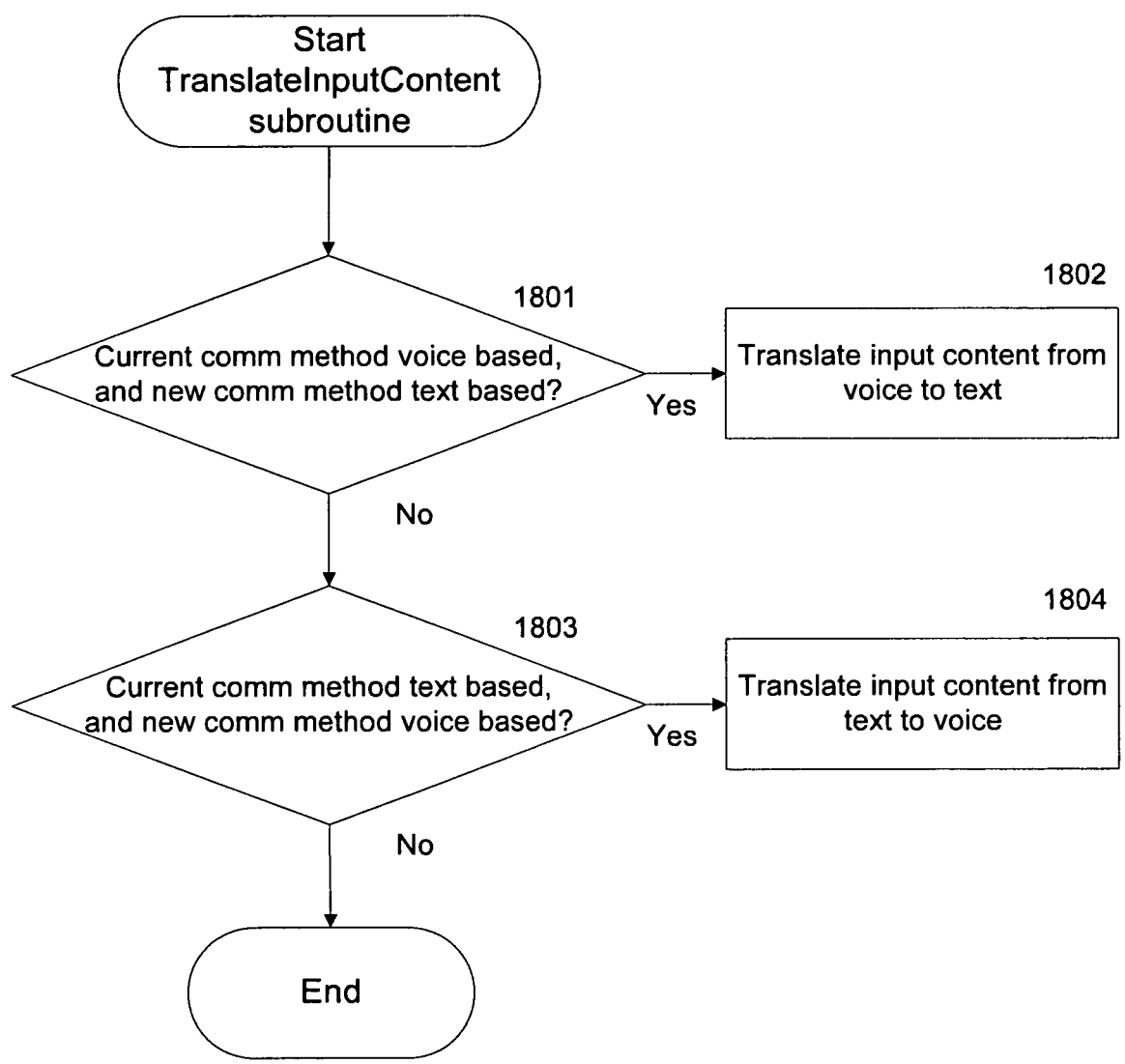

FIG. 18 is a flowchart of a method for translating input content according to one example. The method of FIG. 18 is a subroutine named TranslateInputContent which is called by the CommMethodSelected subroutine of FIG. 13 in response to a user selecting a communication method in the message composition window. The input content may be in any media format and is provided by a user. For example, FIG. 2 shows input content 209 in a text-based format. The method of FIG. 16 translates input content between text and voice formats. Translation between other formats not described here can be achieved by using translation methods for the other formats in the same way that speech-to-text and text-to-speech translation are used in this method. The method begins at block 1801 by first checking if the newly-selected communication method is voice-based, e.g., Voice-Over-IP, voicemail, or an encoded audio method, and the current communication method is text-based, e.g., Email or IM. If that first condition is true, block 1802 translates the current input content using a text-to-voice method, e.g., a speech synthesis method to synthesize speech as audio data, and the audio data becomes the new input content. If that first condition is false, then block 1803 checks for the opposite situation by checking the corresponding second condition, i.e., if the newly-selected communication method is text based, and the current communication method is voice-based. If that second condition is true, then block 1804 translates the input content using a voice-to-text method, e.g., a voice recognition method that generates a text equivalent of the speech encoded in the input content, and the text equivalent becomes the new input content, replacing the speech content. If neither condition is true, then no translation of the input content is performed.

The messaging interface logic can be used to switch communication methods based upon characteristics of the input content and characteristics of the communication method. For example, when input content is being composed in SMS mode and input content becomes too long for a single SMS message, a user can switch to IM mode and continue composing the message. Furthermore, the integrated communication interface can automatically switch between communication methods based on the input content, e.g., automatically switch from SMS to IM mode when the input content length exceeds the limit on SMS content.

In one example, the integrated communication interface monitors characteristics of the input content as the content is being provided, and, if the characteristics exceed predefined ranges, automatically switches changes the communication method to a different method capable of handling input content with those characteristics. The automatic switching is carried out by invoking the CommMethodSelected subroutine of FIG. 13 with the different method as an input parameter. For example, when input content for an SMS message is being composed, the communication method is SMS, and the integrated communication interface monitors the length of the input content according to a rule for SMS specifying that the length of an SMS message cannot exceed a certain maximum number of characters, e.g., 160 characters. As the input content is being received, e.g., from a user typing text, if more than the maximum number of characters are received, then the integrated communication interface may automatically switch the communication method to a different method which has characteristics indicating that it can send input content of a larger maximum length, e.g., IM.

Figure 19:
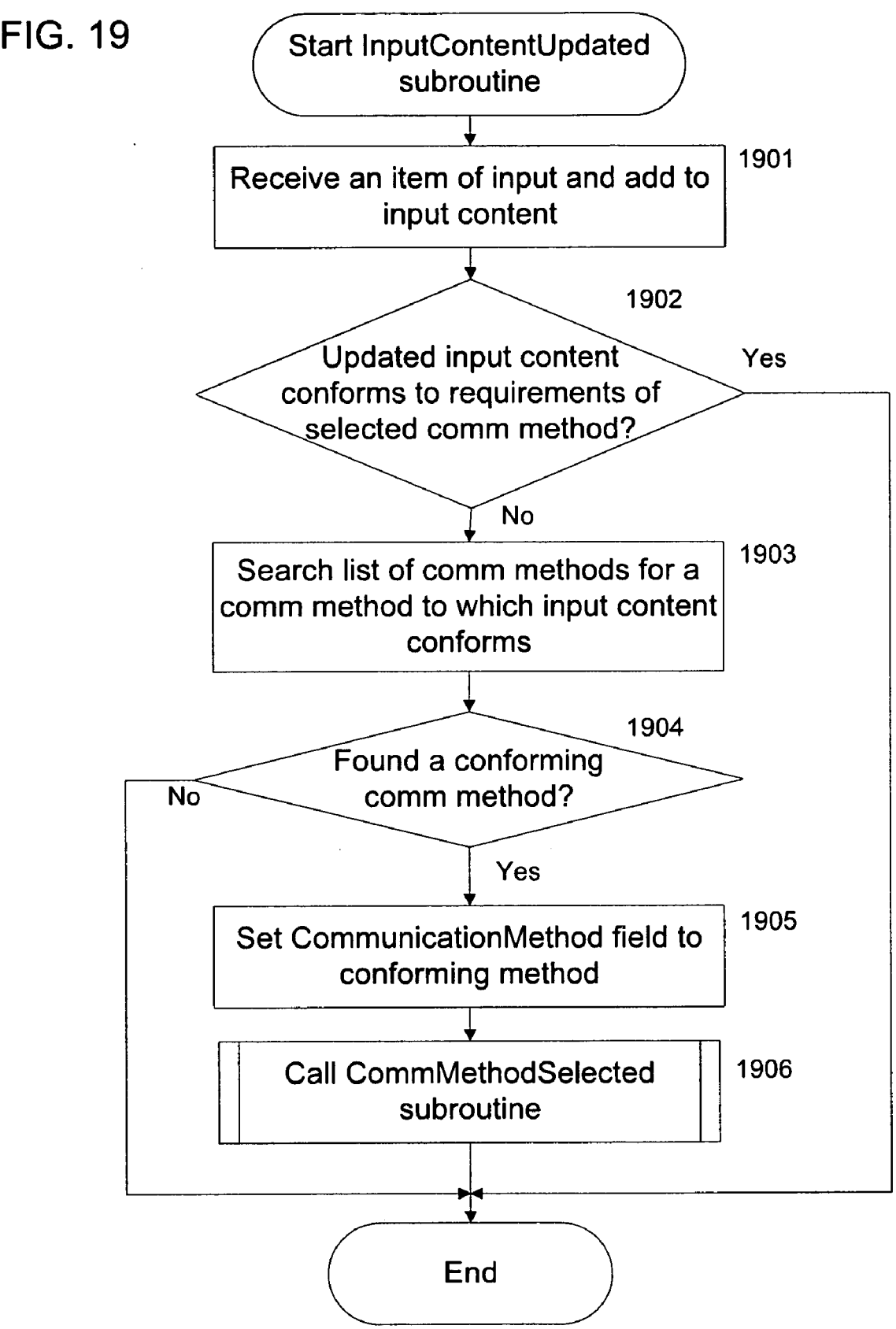
FIG. 19 is a flowchart illustrating a method for automatically selecting a communication method based on input content.

FIG. 19 is a flowchart illustrating a method for automatically selecting a communication method based on input content. The method of FIG. 19 is a subroutine named InputContentUpdated, which is called, e.g., by a windowing system or user interface framework, when a user provides an item of input content, such as a text character or a fragment of voice data. The InputContentUpdated subroutine begins at block 1901 when an item of input content is received, e.g., a text character or a fragment of voice data is provided by a user composing input content for a message. At block 1902, the subroutine determines whether the input content, including the item received at block 1901, conforms to a set of one or more requirements associated with the selected communication method. For example, the set of requirements could include a maximum character length or size limit, in which case block 1902 would determine whether the input content's length is less than or equal to the maximum character length or size limit. If the input content conforms to the set of requirements, then the subroutine terminates. Otherwise, the input content does not conform to the requirements of the selected communication method, and block 1903 performs a search of a list of communication methods and associated requirements to find a communication method to which the input content does conform. If such a conforming method is not found, the subroutine terminates, leaving the selected communication method unchanged. If a conforming method is found, the subroutine sets the CommunicationMethod field (i.e., the selected communication method) to the confirming method at block 1906, and calls the CommMethodSelected subroutine at block 1906 to cause the user interface to display the selected communication method and transform the input content if necessary.

A participant name and a communication method together form an integrated communication address that can be used instead of or in addition to communication-method specific addresses such as Email addresses. That is, a user can send a message to a participant and communication method type without knowing a specific address, as long as the specific address can be determined directly or indirectly by the integrated communication interface. The GetAddress subroutine shows how an integrated communication address can be used to send messages to communication-specific addresses.

The messaging interface logic is not limited to the configurations, appearances, or user interactions described in these examples. In particular, the messaging interface logic may feature multiple windows. For example, with reference to the components of FIG. 8, some components may be in one window and some components may be in a different window.

In some examples, an integrated communication method may automatically choose a communication method based on preferences or presence information, or may sort a list of communication methods based on preferences or presence information. For example, with respect to FIG. 3, if a user has set their preferences to indicate that email is their preferred communication method, then an integrated communication interface would select Email as the default value for communication method 204. If a user has set their preferences to indicate that they do not wish to be contacted by email, then an integrated communication interface would not include Email as a possibility for communication method 204 or in communication method menu 311. An integrated communication method could similarly set the default value for communication method 204 to a method via which the user is accessible according to the user's online presence, and could only include methods in menu 311 via which the user is accessible according to presence or preference.

The above description is exemplary only and it will be apparent to those of ordinary skill in the art that numerous modifications and variations are possible. For example, various exemplary methods and systems described herein may be used alone or in combination with various other computer and computer peripheral systems and methods. Additionally, particular examples have been discussed and how these examples are thought to address certain disadvantages in related art. This discussion is not meant, however, to restrict the various examples to methods and/or systems that actually address or solve the disadvantages.

What is claimed is:

1. A computer-implemented method of providing a messaging interface, comprising the steps of:
    causing the display of a list of communication methods;
    enabling selection of a first communication method and a second communication method from the list, wherein input content created for use with the first communication method is duplicated as input content for use with the second communication method, and wherein the duplicated input content is editable; and
    initiating transmission of input content to at least one recipient based upon the selected communication method.

2. The method of claim 1, wherein the communication methods comprise messaging protocols.

3. The method of claim 1, wherein selection of the first communication method does not alter the input content.

4. The method of claim 1, wherein the messaging interface has a format based upon the first communication method.

5. The method of claim 1, wherein the input content comprises text.

6. The method of claim 1, wherein the input content comprises voice.

7. The method of claim 1, wherein the list of communication methods includes electronic mail, instant messaging, short message service, and chat.

8. The method of claim 1, wherein the list of communication methods is based upon presence information associated with the at least one recipient.

9. The method of claim 1, wherein the list of communication methods is based upon preference information associated with the at least one recipient.

10. The method of claim 1, wherein the list of communication methods is in a sorted order based upon presence information associated with the at least one recipient.

11. The method of claim 1, wherein the list of communication methods is in a sorted order based upon preference information associated with the at least one participant.

12. The method of claim 1, wherein the list of communication methods includes a text-based method and a voice-based method, further comprising the step of translating the input content between text and voice.

13. The method of claim 12, further comprising the step of:
    if a different communication method is selected, initiating translation of the input content between text and voice.

14. A computer-implemented method of providing a list of at least one participant, comprising the steps of:
    causing the display of the list of at least one participant, wherein the at least one participant is associated with a list of at least one selectable communication method;
    enabling selection of a selected communication method from the list of at least one selectable communication method;
    invoking a messaging interface in response to selection of the selected communication method, wherein the messaging interface is configured for sending a message to the at least one participant using the selected communication method;
    enabling selection of a selected participant from the list of at least one participant; and
    invoking a messaging interface in response to selection of the selected participant, wherein the messaging interface is configured for sending a message to the selected participant using a default communication method associated with the selected participant.

15. The method of claim 14, further comprising the steps of:
    causing the display of a participant display associated with the at least one participant, wherein the participant display includes a list of at least one communication method; and
    enabling selection of the default communication method from the list of at least one communication method.

16. The method of claim 14, further comprising the step of:
    causing the display of an online presence indicator associated with the at least one participant, wherein the online presence indicator is based upon online presence information associated with the at least one participant.

17. The method of claim 14, further comprising the step of:
    causing the display of a status indicator associated with the at least one participant, wherein the status indicator is based upon availability status information associated with the at least one participant.

18. A computer readable storage medium comprising computer readable instructions for providing a messaging interface, the instructions for:
    causing a list of communication methods to be displayed;
    enabling selection of a first communication method and a second communication method from the list, wherein input content created for use with the first communication method is duplicated as input content for use with the second communication method, and wherein the duplicated input content is editable; and
    initiating transmission of input content to at least one recipient based upon the selected communication method.

19. The computer readable storage medium of claim 18, wherein the communication methods comprise messaging protocols.

20. The computer readable storage medium of claim 18, wherein selection of the first communication method does not alter the input content.

21. The computer readable storage medium of claim 18, wherein the messaging interface has a format based upon the first communication method.

22. The computer readable storage medium of claim 18, wherein the input content comprises text.

23. The computer readable storage medium of claim 18, wherein the input content comprises voice.

24. The computer readable storage medium of claim 18, wherein the list of communication methods includes electronic mail, instant messaging, short message service, and chat.

25. The computer readable storage medium of claim 18, wherein the list of communication methods is based upon presence information associated with the at least one recipient.

26. The computer readable storage medium of claim 18, wherein the list of communication methods is based upon preference information associated with the at least one recipient.

27. The computer readable storage medium of claim 18, wherein the list of communication methods is in a sorted order based upon presence information associated with the at least one recipient.

28. The computer readable storage medium of claim 18, wherein the list of communication methods is in a sorted order based upon preference information associated with the at least one participant.

29. The computer readable storage medium of claim 18, wherein the list of communication methods includes a text-based method and a voice-based method, further comprising program code for translating the input content between text and voice.

30. The computer readable storage medium of claim 29, further comprising instructions for:
    initiating translation of the input content between text and voice if a different communication method is selected.

31. A computer readable storage medium comprising computer readable instructions for providing a list of at least one participant, the instructions for:
    causing the display of the list of at least one participant, wherein the at least one participant is associated with a list of at least one selectable communication method;
    enabling selection of a selected communication method from the list of at least one selectable communication method; and
    invoking a messaging interface in response to selection of the selected communication method, wherein the messaging interface is configured for sending a message to the at least one participant using the selected communication method;
    enabling selection of a selected participant from the list of at least one participant; and
    invoking a messaging interface in response to selection of the selected participant, wherein the messaging interface is configured for sending a message to the selected participant using a default communication method associated with the selected participant.

32. The computer readable storage medium of claim 31, further comprising instructions for:
    causing the display of a participant display associated with the at least one participant, wherein the participant display includes a list of at least one communication method; and
    enabling selection of the default communication method from the list of at least one communication method.

33. The computer readable storage medium of claim 31, further comprising instructions for:
    causing the display of an online presence indicator associated with the at least one participant, wherein the online presence indicator is based upon online presence information associated with the at least one participant.

34. The computer readable storage medium of claim 31, further comprising instructions for:
    causing the display of a status indicator associated with the at least one participant, wherein the status indicator is based upon availability status information associated with the at least one participant.

* * * * *